Dec. 5, 1961          G. H. WOTRING          3,012,112

TIMER

Filed Aug. 28, 1956          5 Sheets-Sheet 1

INVENTOR.
GAYLORD H. WOTRING
BY

HIS ATTORNEY

Dec. 5, 1961    G. H. WOTRING    3,012,112
TIMER
Filed Aug. 28, 1956    5 Sheets-Sheet 2

INVENTOR.
GAYLORD H. WOTRING
BY Martin Kalikow
HIS ATTORNEY

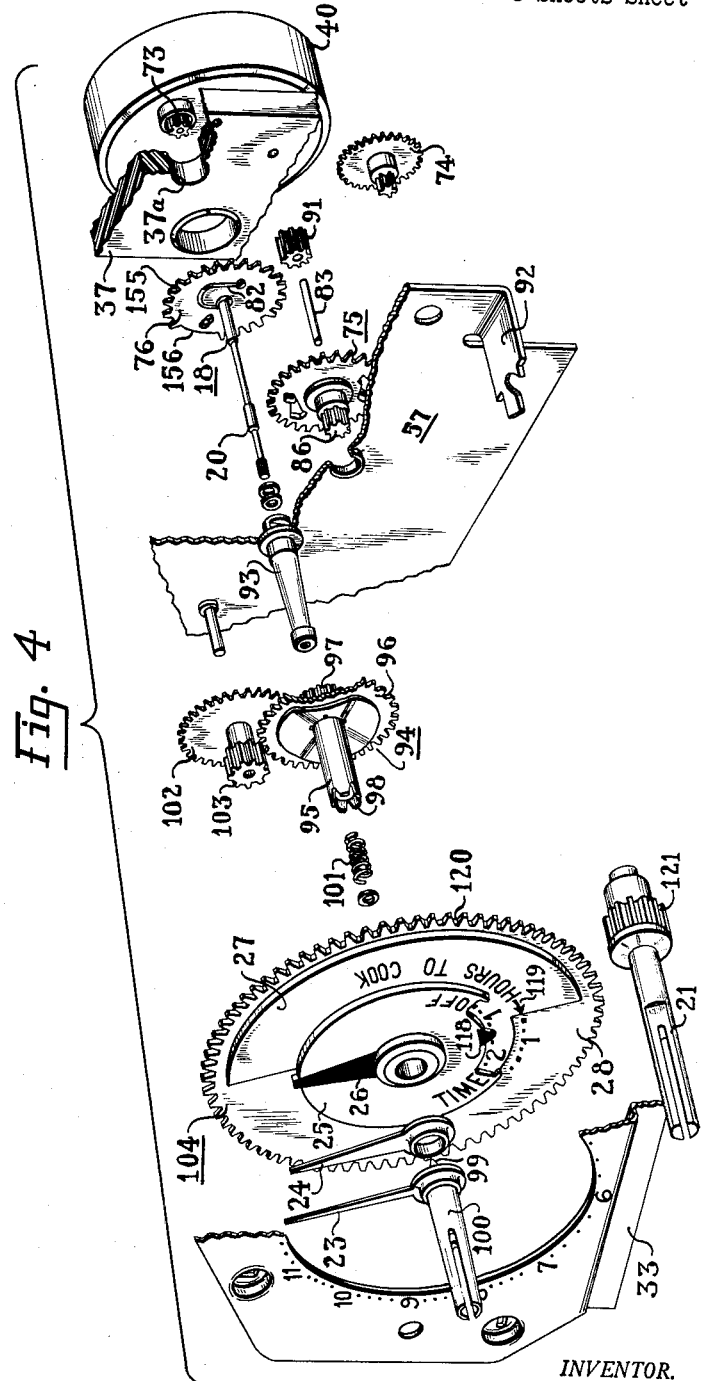

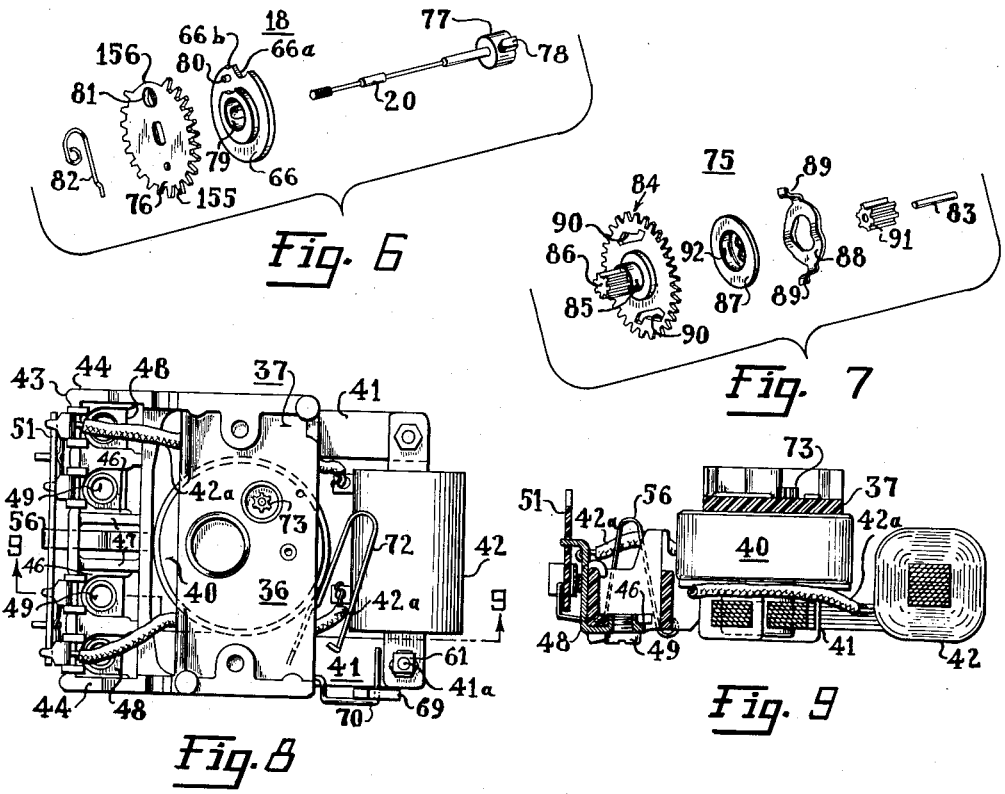

Dec. 5, 1961  G. H. WOTRING  3,012,112
TIMER

Filed Aug. 28, 1956  5 Sheets-Sheet 5

INVENTOR.
GAYLORD H. WOTRING
BY Martin Kalikow
HIS ATTORNEY

United States Patent Office 3,012,112
Patented Dec. 5, 1961

3,012,112
TIMER
Gaylord H. Wotring, Morrison, Ill., assignor to General Electric Company, a corporation of New York
Filed Aug. 28, 1956, Ser. No. 606,617
11 Claims. (Cl. 200—38)

My invention relates to electric timers and, more particularly, to electric timers for controlling or monitoring the time involved in actuating an electric switch or other operation. The invention is particularly applicable to timers for controlling and monitoring the cooking and baking operations of an electric range.

Modern electric range timers serve several timing functions. They generally include a clock for indicating time of day, a means for automatically controlling the start and stop times of an oven and they often include a time monitoring means commonly called an "interval timer" for giving an alarm after a preset amount of cooking time has elapsed. Each of these functions may be performed by separate timing devices but they are often combined in a single timer operated by a single timing motor. In order to perform all of these functions in a single device, suitable indicators must be provided for indicating clock time, stop time, cooking time, and elapsed interval time, and, in addition, a plurality of shafts or other means must be provided for manual setting or adjusting these indicators to positions required to perform their desired timing, controlling or monitoring functions. As a consequence, such multipurpose timers have heretofore generally been rather complicated, bulky or expensive and have included many independent setting shafts tending to confuse the operator.

Accordingly, one object of the invention is to provide a multipurpose timer having a relatively simple and inexpensive timing and switch controlling mechanism.

Another object of the invention is to provide a multipurpose timer having unusually small size and weight resulting from a compact arrangement of the various time indicators and also having comparatively few setting shafts.

A further object of the invention is to provide a timer having an unusually compact and rugged supporting structure for the timing motor, switch, terminals, and timing mechanism.

In general, in accord with the invention an interval timer, a clock mechanism, and an oven switch timing mechanism are all arranged concentric with the axis of a single central shaft. This central shaft is constructed and arranged for use in setting both the interval timer and the clock. Because of this concentric arrangement only two additional shafts are required, one for setting the oven switch timing mechanism and the other for cocking the switch.

In accord with another feature of the invention a single insulating base member is provided which not only supports the timing motor with its associated electromagnetic field coil but also supports the electric switch and provides a terminal block for all terminals. Preferably this base member also functions to help support the interval timer alarm and to house and support several of the gears in the various timing mechanisms.

The novel features believed characteristic of the invention are set forth in the appended claims. The invention itself, however, together with further objects and advantages thereof may be easily understood by referring to the following description taken in connection with the accompanying drawings in which—

Figure 1:
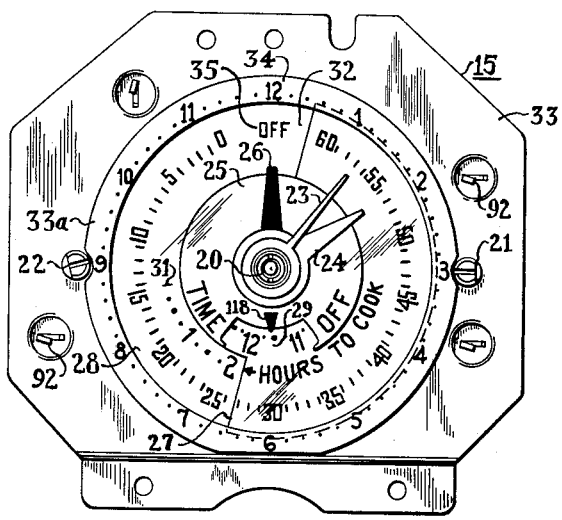
FIGURE 1 is a front view of a timer embodying the invention.
Figure 2:
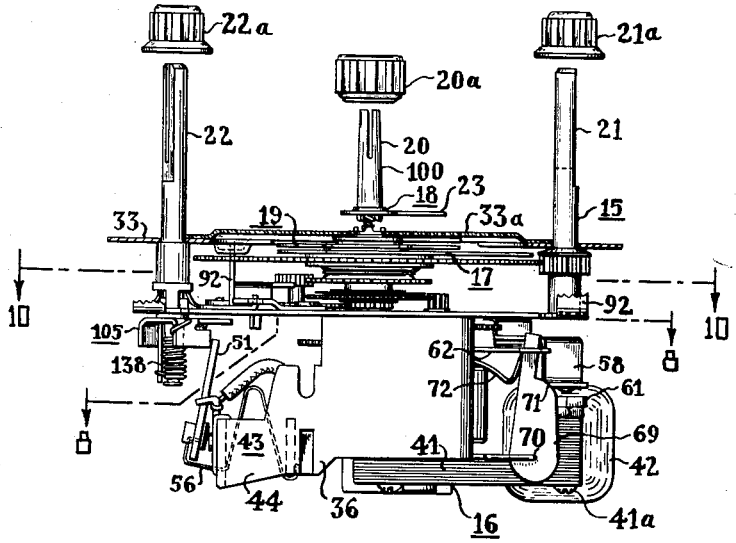
FIGURE 2 is a bottom elevation of the timer of FIGURE 1.
Figure 3:
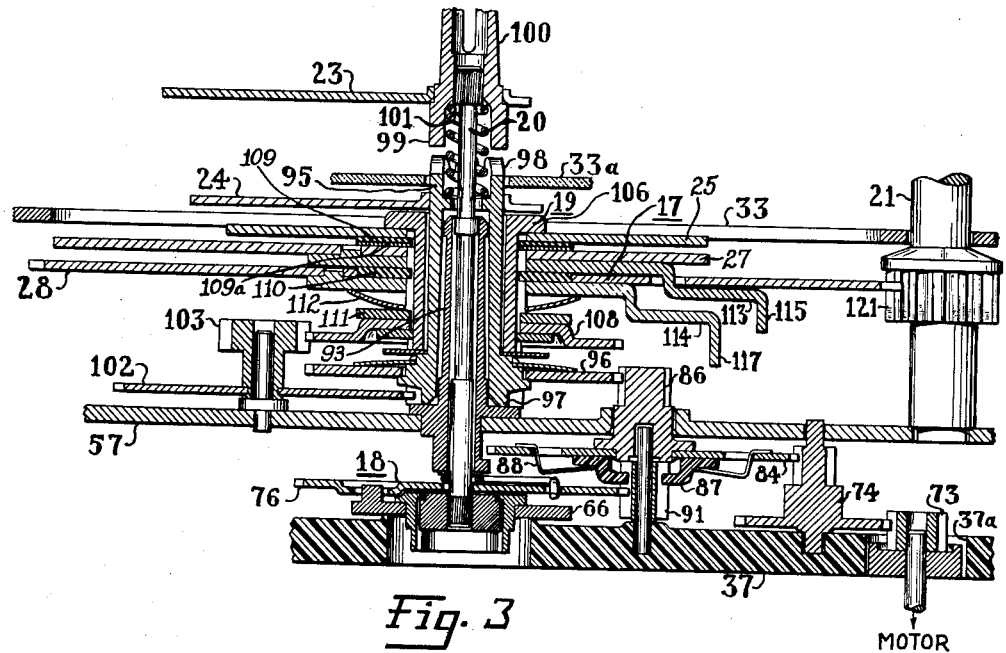
Figure 5:
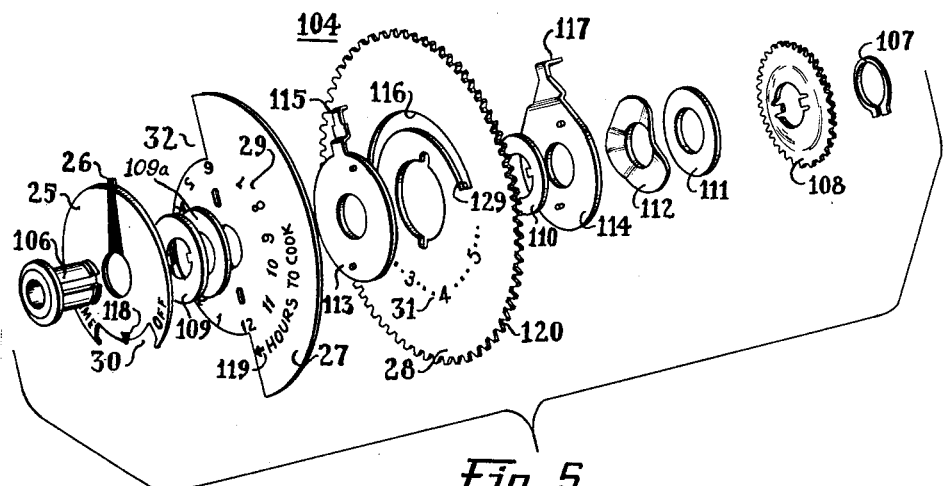
Figure 11:
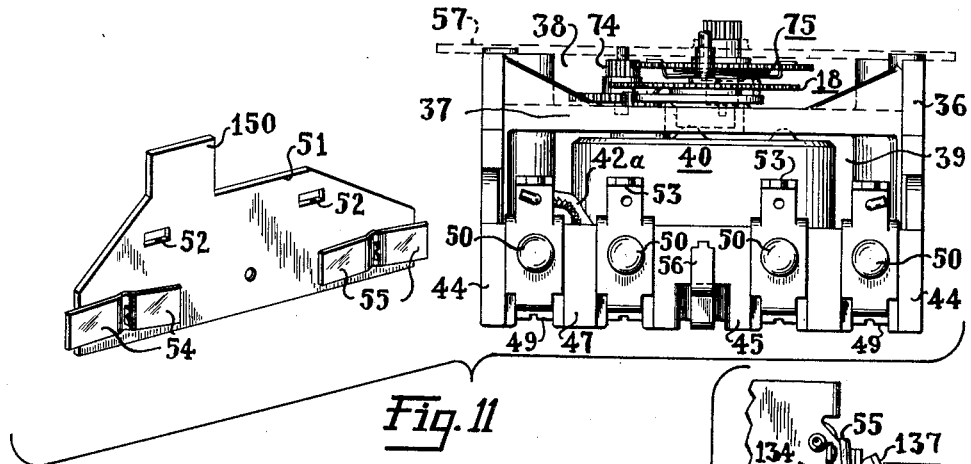
Figure 12:
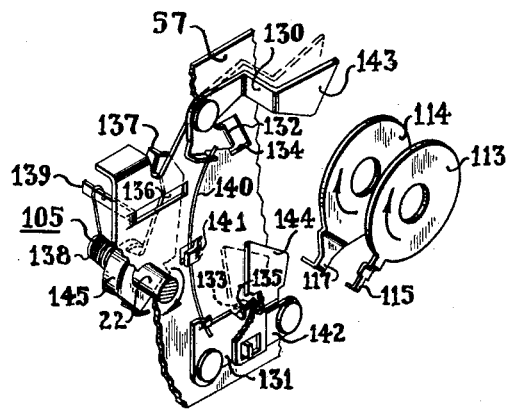
Figure 13:
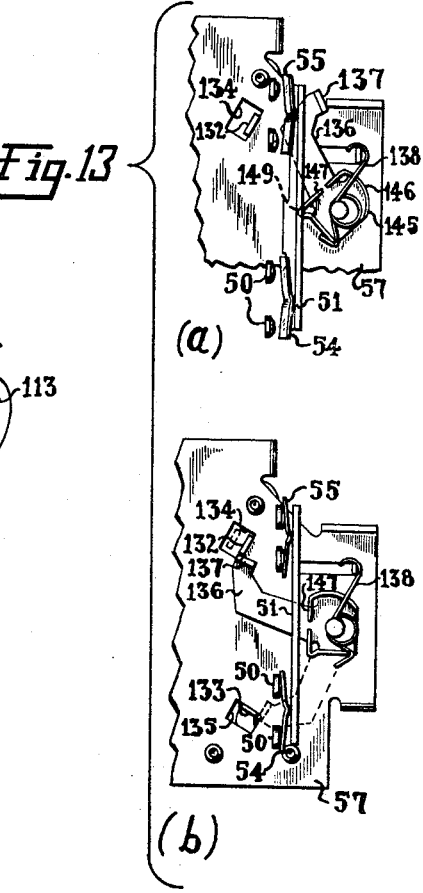

FIGURE 3 is a fragmentary sectional view taken through the central shaft of the timer of FIGURE 1, FIGURE 4 is a fragmentary exploded view in perspective of the timer mechanism shown in FIGURE 3, FIGURE 5 is an exploded perspective view of the switch timing assembly shown assembled in FIGURE 4, FIGURE 6 is an exploded perspective view of the interval timer alarm actuating assembly shown in assembled relation in FIGURE 4, FIGURE 7 is an exploded perspective view of a clutch driving mechanism for the interval timer shown in assembled relation in FIGURE 4, FIGURE 8 is a top view of the switch and motor assembly taken along line 8—8 of FIGURE 2, FIGURE 9 is a side view of the motor and switch assembly taken along line 9—9 of FIGURE 8, FIGURE 10 is a view of a supporting plate between the base assembly and the timing mechanism assembly taken generally along the line 10—10 of FIGURE 2, with certain parts removed to enhance the simplicity and understanding thereof, FIGURE 11 is another side view of the base assembly with switch armature removed, FIGURE 12 is a perspective view of the switch actuating mechanism, and FIGURE 13 includes two views illustrating the operation of the switch cocking member.

In the drawings the same components are designated by the same numerals.

Referring to FIGURES 1, 2 and 3, my invention is shown in one form embodied in a range timer 15 comprising a base assembly 16, an oven switch controlling assembly or mechanism 17, an interval timing assembly or mechanism 18 and a clock time assembly or mechanism 19. The front of the timer 15 presents a central setting shaft 20 and two other setting shafts 21 and 22 on opposite sides of the central shaft 20. Knobs 20a, 21a, and 22a (FIGURE 2) are provided for manual operation of shafts 20, 21 and 22.

All of the time monitors or indicators of the timer are arranged concentric with the central shaft 20 in a manner more fully to be described hereinafter. Shaft 20 forms a portion of the "interval timer" mechanism 18 and functions to permit setting of both a suitable time monitoring indicator or pointer 23, and a clock time indicating means including a minute hand 24 and an hour disc 25 having an hour hand 26 painted thereon. Shaft 21 functions to set a stop time indicator or disc 27 and a cooking time indicator or disc 28 while shaft 22 functions to cock the oven switch. Stop time indicator 27 has circular 12-hour dial 29 visible through a window 30 in the hour disc 25, while cooking time indicator 28 has a semicircular 6-hour dial 31 visible through a semicircular cutaway portion or window 32 of the stop time indicator 27. A front plate 33 of the timer has a clock dial 34 and carries a glass plate 33a with an interval timer dial 35 marked thereon.

Referring now to FIGURES 2, 8, 9, 10 and 11 the base assembly 16 comprises a molded insulating base member 36 composed of any suitable plastic material such as a phenolic condensate product. Base member 36 has an integral shelf or septum 37 (FIGURE 11) dividing its body portion into upper and lower recesses or cavities 38 and 39, respectively. A small hysteresis-type synchronous motor 40 is located within lower cavity 39 with its magnetic yoke 41 fastened to the underside of base member 36. Magnetic yoke 41 extends laterally to one side of base member 36 and carries the motor field coil 42.

Base member 36 also has a switch and terminal supporting portion 43 molded integrally with the body portion thereof on the opposite side of the motor from the field coil 42. Switch and terminal supporting portion 43 of base member 36 comprises a pair of spaced arms 44 bridged by a terminal block 45. Terminal block 45 has a plurality of apertures 46 (FIG. 8) formed therethrough separated by a plurality of flanges 47 to form separate terminal compartments. L-shaped terminals 48 fit within each of these compartments and contain terminal screws 49 within apertures 46 accessible from the rear of the timer. Terminals 48 also carry stationary contacts 50 along one side of the timer. The motor field coil 42 is connected through wires 42a to one pair of terminals 48. An insulated armature plate 51 is pivoted by means of apertures 52 on the upper ends 53 of a pair of these L-shaped terminal members and carries two pair of bridged movable contacts 54, 55 which are adapted to make connection between the stationary contacts 50 on adjacent pairs of terminals 48 fastened to terminal block 45. A V-shaped leaf spring 56 is arranged between terminal block 45 and armature plate 51 normally to bias the contacts closed. Armature plate 51 is actuated by an oven switch control mechanism to be described hereinafter.

The insulating base member 36 together with a metal plate 57 which is fastened to base member 36 and covers the top of its upper cavity 38 also supports and houses the driving mechanism and alarm actuating mechanism for the "interval timer" portion of the invention. The alarm for the interval timer comprises a flat metal buzzer arm or strip 58 (FIGURE 10) having one end 59 fastened to plate 57 and having the other end 60 bent to overlie a nut 61 fastened to one screw 41a holding the laminations of yoke 41 together. Metal strip 58 is slightly flexible and the air gap between nut 61 and the end 60 of strip 58 is adjusted to be such that a buzzing action will occur if unrestrained under the influence of the magnetic field around yoke 40. The buzzer provided by metal strip 58, however, is normally prevented by sounding by a cam follower 62 comprising another flat metal strip pivoted at 63 and having a laterally extending cam follower arm 64 whose end 65 rides upon the periphery of a driven cam 66. The free end 67 of cam follower 62 has a slot 68 which accommodates a buzzer operating cam 69 (FIGURE 2) pivoted on a wire 70 fastened to yoke 41. An upper shoulder 71 of operating cam 69 engages and restrains from buzzing the free end 60 of buzzer arm 58. A wire spring 72 serves to bias cam follower 62 against the surface of cam 66 and causes the cam follower 62 to move laterally when the end 65 of its arm 64 falls within a deep notch 66a of cam 66. This is the alarm position of the interval timer at which the buzzer sounds. A slight further rotation of cam 66 carries end 65 of cam follower arm 64 into a slight notch 66b of cam 66 corresponding to the "off" position of interval timer 18. In this "off" position shoulder 71 of operating cam 69 restrains buzzer arm 58.

Referring to FIGURES 3, 4, 6, 7 and 11 cam 66 is rotated by motor 40 through a gear train located within upper cavity 38 of base member 36. This gear train comprises a driving pinion gear 73 of motor 40 extending through an aperture 37a in shelf 37, gear and pinion 74, gear and clutch assembly 75, mutilated gear 76, and cam 66. As best shown in FIGURE 6, cam 66 is keyed to the lower end 77 of central shaft 20 by a key 78 which fits within a hub 79 of the cam 66. Cam 66 has a small pin 80 thereon which fits within slot 81 of the mutilated gear 76 such that the entire assembly rotates together with shaft 20. A small wire spring 82 between shaft 20 and gear 76 serves to hold gear 76 in place upon cam 66.

The gear and clutch assembly 75 for driving mutilated gear 76 is pivotally mounted on axle 83 between shelf 37 of base member 36 and metal plate 57. The gear and clutch assembly is shown in exploded perspective in FIGURE 7 and comprises a gear 84 having an integrally formed hub 85 journalled in plate 57 and a driving pinion 86 extending beyond the upper surface of plate 57. A clutch member such as slip ring 87, composed of low friction material such as nylon, is held against the under surface of gear 84 by a suitable snap ring 88 having retaining ears 89 which fit through suitable diametrically opposed slots 90 in gear 84. A pinion 91 pivoted on axle 83 is keyed within a central aperture 92 of slip ring 87 and rotates together therewith. Pinion 91 meshes with the teeth of mutilated gear 76.

Referring now to FIGURES 2, 3, and 4, a clock timing mechanism 19 is shown carried generally by plate 57 and located between plate 57 and the front plate 33. Front plate 33 is also supported by plate 57 on upstanding supporting arms 92. This clock timing mechanism is driven by pinion 86 of gear and clutch assembly 75 and functions to operate minute hand 24 and hour disc 25. It comprises a central sleeve 93 securely fastened at its bottom end to plate 57 and surrounding the central shaft 20 of the interval timer assembly 18. Rotatably journalled on sleeve 93 is a minute hand assembly 94 including a cylindrical shaft or cylinder 95 having fastened thereto at its lower end a driving gear 96 and pinion 97, the driving gear 96 being in turn driven by pinion 86 of the gear and clutch assembly 75. Minute hand 24 is fastened to the upper end portion of cylinder 95. The front end of hollow cylinder 95 preferably has a plurality of teeth 98 to receive corresponding driving teeth 99 of the manually operable front end portion 100 of shaft 20. Shaft 20 is rotatably journalled within sleeve 93 and simultaneously supported therein for limited axial movement between two axial positions. A spring 101 between the confronting ends of cylinder 95 and shaft portion 100 normally biases shaft 20 in its forward axial position with teeth 99 out of engagement with teeth 98. Reduction gears 102, 103 connected to minute hand pinion 97 serve to drive the switch timing assembly 104 (FIG. 4) including hour disc 25 at a speed of one revolution every twelve hours.

Referring now to FIGURES 2, 3, 4, 5, 12 and 13 there is shown the oven switch controlling mechanism comprising the switch timing assembly or mechanism 104, best seen in FIGURE 5 and the switch actuating assembly or mechanism 105, best seen in FIGURE 12. The switch timer assembly includes the hour disc 25, the stop time indicator 27 and the cooking time indicator 28 and associated means for driving and setting these indicators. The entire assembly is mounted on a central hub 106 and fastened together by a snap ring 107. An hour gear 108 is keyed to hub 106 and is driven by reduction gear 103 (FIGURE 4). Friction clutch means such as washers 109, 110 and 111 are interposed between each of the indicating discs and the driving gear 108 and are biased in frictional engagement with one another by virtue of a bent circular clutch spring 112.

Two operating members 113 and 114 are provided for triggering the switch actuating mechanism 105 at proper preset times. Operating member 113 is carried by the stop time indicator 27 and has an arm projection 115 extending through a semicircular slot 116 in the cooking time indicator 28. Operating member 114 is carried by cooking time indicator 28 and has a similar operating arm projection 117 extending a shorter radius from central hub 106 than the projection 115 of operating member 113. Projections 115 and 117 function to trigger suitable latching means for the switch actuating mechanism 105 as will be more fully described hereinafter. Hour disc 25 preferably has a pointer 118 painted thereon for setting the stop time on dial 29 of stop time indicator 27 visible through window 30 of hour disc 25. Stop time indicator 27 likewise has a pointer 119 for setting the "hours-to-cook" on dial 31 of cooking time indicator 28 visible through the semicircular window 32 of stop time indicator 27. Cooking time indicator 28 has a toothed periphery 120 which engages a setting gear 121 attached to setting shaft 21. It will be appreciated that continued rotation of cooking time indicator 28 in either direction will eventually bring the extremities of slot 116 into engagement with the arm projection 115 of operating member 113 and thereby cause stop time indicator 27 to be rotated together therewith. Operating member 113 is oriented on stop time indicator 27 such that the cooking time dial 31 will be hidden beneath stop time indicator 27 when both indicators are rotating together and will be exposed when one indicator is rotating relative to the other.

The switch actuating mechanism 105 is shown in FIGURES 12 and 13 and comprises a pair of "stop" and "start" time latching levers 130 and 131 respectively pivoted in supporting plate 57 and having latching projections 132 and 133 extending through suitable windows 134, 135 beyond the rear surface of plate 57. A switch actuating member 136 carried by cocking shaft 22 has its free end 137 arranged to be rotated into latched engagement with either the "stop time" latching projection 132 or the "start time" latching projection 133 depending upon the degree of angular rotation of shaft 22. In setting the timer for an automatic cooking operation, the end 137 is normally pivoted beyond "stop time" latch 132 into latching engagement with "start time" latch 133 of latching lever 131. Helical spring 138 connected between a projection 139 of plate 57 and switch actuating member 136 continually biases member 136 for rotation in a counterclockwise direction. Wire spring 140 extending between a projection 141 on plate 57 and each of the latching levers 130 and 131 serves to bias these levers into latch engaging positions.

The release of the latching engagement between "start time" lever 131 and switch actuating member 136 functions to close the switch contacts 50, 54 and 55 while the release of latching engagement between "stop time" latching lever 130 and switch actuating member 136 functions to open these switch contacts. Consequently, latching lever 131 is arranged to be actuated by operating member 114 attached to the cooking time indicator 28 while operating lever 130 is arranged to be actuated by the operating member 113 attached to the "stop time" indicator 27. An additional operating lever 142 making an articulated connection with lever 131 is arranged in the path of the operating projection 117 of operating member 114 to cause a clockwise movement of the latching projection 133 of lever 131 thereby to release end 137 of switch actuating member 136. Lever 130 has an integral upstanding operating arm portion 143 in the path of rotation of projection 115 of "stop time" operating member 113. Operating members 113 and 114 are oriented on their respective cooking time and "stop time" indicators 27, 28 such that the projections 115 and 117 respectively engage the operating portions 143 and 144 of levers 130 and 142 respectively when the cooking time dial 31 is in its zero position fully behind and hidden by the "stop time" indicator 27.

The operation of the armature plate 51 by the switch actuating member 136 is shown in FIGURE 13. Switch actuating member 136 has an integral rearwardly extending cam portion 145 having one rounded surface 146 and outwardly bent corner 149. In the normal "off" position of shaft 22 and member 136, corner 149 bears against the upper operating portion 150 (FIGURE 11) of armature plate 51 and pivots the plate to maintain the switch contacts 50, 54 and 55 open. When shaft 22 is rotated into its "set" position with the end 137 of switch actuating member 136 latched behind "start time" latching lever 131, rounded surface 146 again engages operating portion 150 of armature plate 51 to maintain the switch contacts open. However, when switch actuating member 136 is released to rotate out of engagement with "start time" latching lever 131 into engagement with "stop time" latching lever 130, flat side 147 of cam portion 145 becomes parallel with and spaced from armature plate portion 150 as shown in solid lines in FIGURE 13(b). Armature plate 51 is then pivoted under the force of its biasing leaf spring 56 to close and bridge contacts 50 by bridging contact members 54, 55.

In the operation of the oven-switch timing mechanism of timer 15 shaft 21 is first rotated clockwise by means of knob 21a thereby to drive cooking time indicator gear 28 counterclockwise until the extremity 129 of slot 116 engages the edge of projection 115 of operating member 113. During this setting operation, cooking time dial 31 is erasing beneath the "stop time" indicator 27, and at the time that such engagement occurs no "hours-to-cook" are indicated opposite pointer 119. Continued rotation of setting shaft 21 in a clockwise direction causes both the cooking time indicator 28 and the "stop time" indicator 27 to be carried counterclockwise until the proper "stop time" is indicated beneath arrow 118 in the window 30 of hour disc 25. Shaft 21 is then rotated counterclockwise causing cooking time indicator to rotate clockwise until the proper cooking time is indicated opposite arrow 119 beneath the window 32 of "stop time" indicator 27. The switch cocking shaft 22 is then rotated clockwise by means of a suitable knob 22a to bring switch actuating member 136 beyond "stop time" latch 130 into engagement with "start time" latch 131. The setting for automatic timed operation of the oven switch is then complete.

In the automatic operation of the oven switch, the entire switch timing assembly 104 shown exploded in FIGURE 5 is rotated by the timing motor through gears 73, 74, 84, 86, 96, 97, 102, and 103 to drive hour gear 108. As this entire timing assembly 104 rotates, the hour hand 26 continues to read the proper time of day while the operating members 113 and 114 are rotated clockwise toward operation of their respective latching levers 130 and 131. Since operating members 113 and 114 are oriented on their respective indicators 27 and 28 to trigger both latching levers simultaneously when "stop time" dial 29 reads time of day and cooking time dial 31 reads zero "hours-to-cook," it will be appreciated that the angular displacement of these operating members by normal rotation of shaft 21 during the time setting operation will now cause an amount of time corresponding to this preset angular displacement to elapse before these latching levers 130, 131 will be engaged. For example, if time of day is one o'clock and the "stop time" indicator 27 is advanced to six o'clock, the cooking time indicator will be carried together with the "stop time" indicator to this six o'clock position before it can be set back to indicate the cooking period which, for example, may be set to be three hours. The "stop time" operating member 113 will then be oriented five hours in advance of engagement with its associated latching lever 130 while cooking time operating member 114 will be oriented only two hours in advance of engagement with its associated latching lever 131. The rotation of the entire assembly under the influence of timing motor 40 will bring projection 117 of cooking time operating member 114 into operative engagement with latching lever 131 after two hours. Switch actuating member 136 will then be released to rotate until it becomes latched upon the "stop time" latching lever 130 and close the oven switch. Three hours later projection 115 of "stop time" operating member 113 will engage the "stop time" latching lever 130 and release the switch actuating member 136 to return to its "off" position again opening the oven switch.

In the operation of the interval timing mechanism of timer 15, shaft 20 is manually rotated without axial movement away from its "off" position to indicate on dial 35 any amount of minutes desired to be elapsed before the alarm is sounded. The counterclockwise setting operation of shaft 20 causes a corresponding counterclockwise rotation of mutilated gear 76 and cam 66 bringing the toothed portion 155 of gear 76 into engagement with pinion 91 and causing the cam follower 64 to ride out of zero position notch 66b of cam 66 and along the circumference of cam 66. During this setting operation pinion 91 moves freely without causing rotation of gear 75 due to clutch 87, 88. When the setting operation is completed, the timing motor 40 drives the interval timer shaft 20 at the rate of ⅞ of one revolution per hour through gears 73, 74, 84, 91 and 76 until the shaft 20 is returned to its alarm position corresponding to the portion 156 of mutilated gear 76 of which the teeth are omitted. Cam follower 64 falls within notch 66a of cam 66 when this alarm position is reached thereby causing shoulder 71 of operating cam 69 to move out of engagement with buzzer armature 58 permitting the buzzer to sound. A further slight clockwise rotation of shaft 20 to its "off" position, causes cam follower 64 to ride up the far surface of notch 66a into the "off" position notch 66b again moving operating cam 69 to restrain the buzzer arm 58.

In order to set the clock to indicate the proper time of day shaft 20 is depressed against the force of spring 101 into a second axial position in which teeth 99 of end portion 100 of shaft 20 engage teeth 98 of the minute hand assembly 94. Rotation of the minute hand assembly causes rotation of the hour hand to indicate the proper time of day through gears 97, 102 and 103 to drive hour gear 108 which simultaneously rotates the hour disc and the entire switch timing assembly 104. During this clock time setting operation the interval timer is also set by rotation of mutilated gear 76 and cam 66. However, after the clock time has been set, the shaft 20 is released to move to its forward axial position and the interval timer may then be manually reset back to its "off" position.

It will be observed from the above description that I have provided a multipurpose timer of small size and of simple and durable construction. The insulated base member 36 for example, serves several functions supporting the motor and motor field, providing a terminal block and supporting the oven switch components, and together with a covering plate 57 supporting the interval timer alarm mechanism and as well as housing the interval timer drive mechanism. The concentric arrangement about the central shaft 20 of all of the indicating dials permits a simple low cost assembly in which a single setting shaft 21 can be used for setting the oven switch timing indicators and likewise permits the single central shaft 20 to function both for setting the interval timer and for setting time of day. The use of latching levers to release the switch cocking arm reduces the load upon the timing motor and permits a single timing motor to be used reliably to drive both the oven switch timing mechanism and the interval timing mechanism as well as the clock mechanism.

Although I have described above one specific embodiment of the invention many modifications may be made and I intend by the apended claims to cover all such modifications as fall within the true scope and spirit of the invention.

What I claim as new and desire to secure by Letters Patent of the United States is:

1. A time switch comprising a timing motor; a setting shaft having an interval time monitoring indicator at one end thereof, said shaft being supported for axial and rotational movement and adapted to be rotated by said timing motor; said time monitoring indicator being driven toward a zero position upon the rotation of said shaft by said timing motor; means supporting a clock time indicator, a stop time indicator and a cooking time indicator for rotation about the axis of said shaft under the influence of said timing motor, and means on said shaft for forming a connection for setting said clock time indicator when said shaft is moved axially.

2. A time switch comprising a timing motor, a setting shaft having an interval time monitoring indicator at one end thereof, said shaft being supported for axial movement between two axial positions and for rotation by said timing motor; said time monitoring indicator being driven toward a zero position upon the rotation of said shaft by said timing motor; means supporting a clock time mechanism and a switch timing mechanism for rotation about the axis of said shaft by said timing motor, means normally biasing said shaft in one axial position, and means on said shaft for forming a connection for setting said clock time mechanism when said shaft is moved to a second axial position against the force of said biasing means.

3. A timer comprising a shaft supported for axial and rotational movement and having an interval time indicator at one end thereof; an alarm; means connected to said shaft for energizing said alarm at a predetermined rotational position of said shaft; a switch; a timing mechanism for said switch supported for rotation about said shaft; a clock timing mechanism supported for rotation about said shaft; a timing motor for rotating said shaft, said switch timing mechanism and said clock timing mechanism; said interval time indicator being driven toward a zero position upon the rotation of said shaft by said timing motor; and means on said shaft for setting said clock time mechanism when said shaft is moved axially.

4. A time switch comprising a timing motor; a first setting shaft having an interval time monitoring indicator at one end thereof; means connected between said timing motor and said first shaft for rotating said first shaft throughout a predetermined portion of one revolution; a clock time indicator supported beneath said time monitoring indicator for rotation about said first shaft under the influence of said timing motor; a stop time indicator and a cooking time indicator also supported for rotation about the axis of said first shaft; friction driving means between said motor, said stop time indicator, and said cooking time indicator; a second shaft spaced from said first shaft and connected to said cooking time indicator for adjusting the rotational position thereof; and a mechanical driving connection between said cooking time indicator and stop time indicator at predetermined relatively rotated positions thereof for setting said stop time indicator; and means on said first shaft for forming a connection for setting said clock time indicator when said first shaft is moved axially.

5. A timer comprising an electric timing motor, an insulating base member for supporting said motor and having a cavity formed therein, said base member partially encompassing said motor, a plate member secured to said base member and covering the top of said cavity, a setting shaft extending through said plate member into said cavity, and interval timing mechanism on said shaft within said cavity driven by said motor; said interval timing mechanism including an indicator mounted on said shaft and driven toward a zero position upon the operation of said mechanism by said motor; a buzzer alarm mounted for operation under the influence of the magnetic field of said motor, and means connected between said interval timer mechanism and said buzzer alarm for initiating operation of said alarm.

6. A timer comprising a switch, a single base member having upper and lower cavities and a portion supporting said switch, an electric timing motor supported in said lower cavity and having a gear extending into said upper cavity, a plate attached to said base member and covering the top of said upper cavity, a switch controlling mechanism carried by said plate, and a driving connection between said timing motor gear and said switch controlling mechanism including a gear train located within said upper cavity.

7. A timer comprising a switch, an insulating base member having upper and lower cavities, an electric timing motor supported within said lower cavity and having a driving gear extending into said upper cavity, a metal plate attached to said base member and covering the top of said upper cavity, an interval timer mechanism carried by said plate and having a portion extending within said upper cavity, a switch timing mechanism carried by said plate, and gearing means located within said upper cavity for forming a driving connection between said motor driving gear and both said interval timer mechanism and said switch timing mechanism.

8. A timer comprising a switch, an insulating base member having upper and lower cavities formed therein, an electric timing motor supported within said lower cavity, a plate member attached to said base member and covering the top of said cavity, a setting shaft extending through said plate member into said upper cavity, an alarm arranged to be energized by the field of said motor, means on said shaft within said upper cavity for energizing said alarm in response to a predetermined rotational position of said shaft, a switch timing mechanism mounted for rotation about said shaft, and gearing means connected to said timing motor for independently rotating said shaft and said switch timing mechanism.

9. A timer comprising a switch, an insulating base member having upper and lower cavities, an electric timing motor mounted within said lower cavity and thereby partially encompassed by said base member, said motor having a driving gear extending into said upper cavity, a plate member attached to said base member and covering the top of said upper cavity, a setting shaft extending through said plate member into said upper cavity, a buzzer alarm operable by the field of said motor, means on said shaft within said upper cavity for initiating operation of said buzzer at a predetermined rotational position of said shaft, a clock time mechanism mounted for rotation about the axis of said shaft, a switch timing mechanism mounted for rotation about the axis of said shaft, gearing means connected to the driving gear of said motor for rotating said shaft, said clock time mechanism and said switch timing mechanism, and means on said shaft for setting said clock time mechanism.

10. The timer of claim 9 comprising a second shaft, a switch actuating member connected to said second shaft, latching means operative on said switch actuating member for cocking said switch open upon movement of said second shaft to a predetermined rotational position, and means for moving said latching means in response to the rotation of said switch timing mechanism to a predetermined position thereby to release said switch actuating member to close said switch.

11. A timer comprising a switch, an insulated base member supporting said switch and having upper and lower cavities formed therein, an electric timing motor supported within said lower cavity, a plate member attached to said base member and covering the top of said upper cavity, a first setting shaft extending through said plate member and supported therein for axial and rotational movement, said first shaft partially overlying said motor, a buzzer alarm operable under the influence of the magnetic field of said motor, means connected to said first shaft within said upper cavity for initiating operation of said buzzer alarm in response to rotation of said first shaft to a predetermined position, a clock timing mechanism and a switch timing mechanism mounted for rotation about the axis of said first shaft, a second shaft for setting said switch timing mechanism, gearing means connected to said timing motor for rotating said first shaft, said clock timing mechanism and said switch timing mechanism, means biasing said shaft in one axial position, and means on said shaft for forming a connection for setting said clock time mechanism upon movement of said shaft into a second axial position against the force of said biasing means.

References Cited in the file of this patent
UNITED STATES PATENTS

| | | |
|---|---|---|
| 1,982,495 | Browning | Nov. 27, 1934 |
| 2,200,110 | Andersen | May 7, 1940 |
| 2,439,732 | Haydon | Apr. 13, 1948 |
| 2,485,195 | Gallagher et al. | Oct. 18, 1949 |
| 2,607,188 | Bowrguin | Aug. 19, 1952 |
| 2,641,661 | Puerner et al. | June 9, 1953 |
| 2,702,322 | Truesdell | Feb. 15, 1955 |
| 2,721,441 | Boyles | Oct. 25, 1955 |
| 2,798,124 | Sharbough | July 2, 1957 |
| 2,811,626 | Tuttle | Oct. 29, 1957 |
| 2,886,106 | Gallagher et al. | May 12, 1959 |